(12) United States Patent
Corder et al.

(10) Patent No.: US 10,430,890 B1
(45) Date of Patent: Oct. 1, 2019

(54) IMAGE-BASED PROCESSING FOR PRODUCTS

(71) Applicant: Allstate Insurance Company, Northbrook, IL (US)

(72) Inventors: Bryan Keith Corder, Gurnee, IL (US); John A. Riggio, Mundelein, IL (US); Carlos D. Sanchez, Bartlett, IL (US)

(73) Assignee: Allstate Insurance Company, Northbrook, IL (US)

(*) Notice: Subject to any disclaimer, the term of this patent is extended or adjusted under 35 U.S.C. 154(b) by 220 days.

(21) Appl. No.: 15/177,944

(22) Filed: Jun. 9, 2016

(51) Int. Cl.
| | | |
|---|---|---|
| *G06Q 40/00* | (2012.01) | |
| *G06Q 40/08* | (2012.01) | |
| *G06K 9/00* | (2006.01) | |
| *H04N 5/33* | (2006.01) | |
| *G06T 7/00* | (2017.01) | |
| *G06T 7/40* | (2017.01) | |
| *G01S 15/89* | (2006.01) | |

(52) U.S. Cl.
CPC ............ *G06Q 40/08* (2013.01); *G01S 15/89* (2013.01); *G06K 9/0063* (2013.01); *G06T 7/0085* (2013.01); *G06T 7/408* (2013.01); *H04N 5/33* (2013.01)

(58) Field of Classification Search
CPC .................................................. G06Q 40/00
USPC ........................................................ 705/38
See application file for complete search history.

(56) References Cited

U.S. PATENT DOCUMENTS 8,346,578 B1 * 1/2013 Hopkins, III .......... G06Q 40/00
382/100

8,650,106 B1 * 2/2014 Hopkins, III .......... G06Q 40/08
705/35
8,774,525 B2 7/2014 Pershing
8,775,219 B2 7/2014 Swanson et al.
9,152,863 B1 10/2015 Grant
9,262,564 B2 2/2016 Plummer et al.
(Continued)

FOREIGN PATENT DOCUMENTS

AU 2014235296 A1 9/2015
WO 02/37367 A1 5/2002

OTHER PUBLICATIONS

EagleView Pictometry, "Property Drone Consortium", downloaded from <http://www.eagleview.com/Industries/Commercial/Insurance.aspx> on May 26, 2016, 20 pages.
(Continued)

*Primary Examiner* — Kirsten S Apple (74) *Attorney, Agent, or Firm* — Banner & Witcoff, Ltd.

(57) ABSTRACT

An aerial image system may generate images of structures providing views that might otherwise be difficult to obtain. These images may be used to determine various characteristics of the structure, which may then be processed for a variety of tasks including product marketing, claim processing and post-claim analysis. The images may be analyzed by the aerial image system or by a ground-based processing system to determine the structural characteristics such as roof age, roof type and roof pitch. In some examples, image analysis techniques such as edge detection and contrast determination may assist in determining the requisite data. Additionally or alternatively, the processing system may direct or control one or more image capture devices to obtain desired images.

20 Claims, 8 Drawing Sheets

(56) References Cited

U.S. PATENT DOCUMENTS

| | | | |
|---|---|---|---|
| 9,505,494 B1* | 11/2016 | Marlow | B64C 39/024 |
| 9,563,201 B1* | 2/2017 | Tofte | G05D 1/0038 |
| 9,612,598 B2* | 4/2017 | Schultz | G05D 1/0094 |
| 9,691,103 B1* | 6/2017 | Hopkins, III | G06Q 40/08 |
| 9,870,609 B2* | 1/2018 | Kompalli | G06T 7/0002 |
| 9,875,509 B1* | 1/2018 | Harvey | G06Q 40/08 |
| 9,894,327 B1* | 2/2018 | Jacob | H04N 7/185 |
| 2009/0204443 A1 | 8/2009 | Tucker et al. | |
| 2009/0265193 A1 | 10/2009 | Collins et al. | |
| 2013/0082227 A1 | 4/2013 | Budenbender et al. | |
| 2013/0226624 A1 | 8/2013 | Blessman et al. | |
| 2013/0311240 A1 | 11/2013 | Pershing et al. | |
| 2014/0316614 A1* | 10/2014 | Newman | G06Q 30/0611 701/3 |
| 2015/0025914 A1 | 1/2015 | Lekas | |
| 2015/0073834 A1 | 3/2015 | Gurenko et al. | |
| 2015/0093047 A1 | 4/2015 | Battcher et al. | |
| 2015/0213315 A1 | 7/2015 | Gross | |
| 2015/0228031 A1 | 8/2015 | Emison et al. | |
| 2015/0248730 A1 | 9/2015 | Pilot et al. | |
| 2015/0302529 A1 | 10/2015 | Jagannathan | |
| 2015/0363717 A1* | 12/2015 | Lim | G06Q 10/0633 705/4 |
| 2016/0048925 A1 | 2/2016 | Emison et al. | |
| 2016/0063642 A1* | 3/2016 | Luciani | G06Q 40/08 705/4 |
| 2016/0117776 A1 | 4/2016 | Maher | |
| 2017/0352100 A1* | 12/2017 | Shreve | G06Q 40/08 |

OTHER PUBLICATIONS

AerialReports, "Rapid Squares Roof Measurement Report", downloaded from <http://www.aerialreports.com/> on May 27, 2016, 5 pages.

* cited by examiner

IMAGE-BASED PROCESSING FOR PRODUCTS

TECHNICAL FIELD

Various aspects of the disclosure relate to an imaging and image-based processing system. More specifically, aspects of the disclosure relate to evaluating insurance needs or targets using aerial or space-based imagery and analysis of such data.

BACKGROUND

Structural information for buildings can be difficult to obtain. Some types of information may be readily accessible such as a number of rooms in a building, property value, square footage, lot size and the like. However, other types of information may be more challenging to obtain. For example, information about parts of a building that are not easily observable may be difficult to collect. Similarly, information that requires close inspection or analysis might be similarly elusive. While aerial imagery and space-based imagery has become more generally available and the use thereof more widespread, the manner in which this type of imagery is analyzed and processed has not achieved a level of sophistication requisite for more accurate assessments of structural risks and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to the analysis and processing of detailed aerial or spaced-based imagery to evaluate a range of characteristics of a building. In one example, the imagery may be analyzed to determine roof information, including a type of roof, an age of the roof and the pitch of the roof. Using that information, an entity such as an insurance provider may improve the processing speed and effectiveness of generating quotes, developing business strategies and claims processing.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Various aspects described herein may be embodied as a method, an apparatus, a system, or a computer readable medium. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In one arrangement, for example, an entity may use satellite devices or drones to obtain images for particular geographic areas. As will be discussed in further detail below, these areas may be identified using various factors, including population, number of homes or other buildings, climate, weather patterns, insurance coverage of the buildings in that area and the like. This information may be fed to a ground-based image processing system. In one example, the image processing system may be part of an insurance processing system that is configured to implement marketing, process claims, provide quotes and the like.

Figure 1:
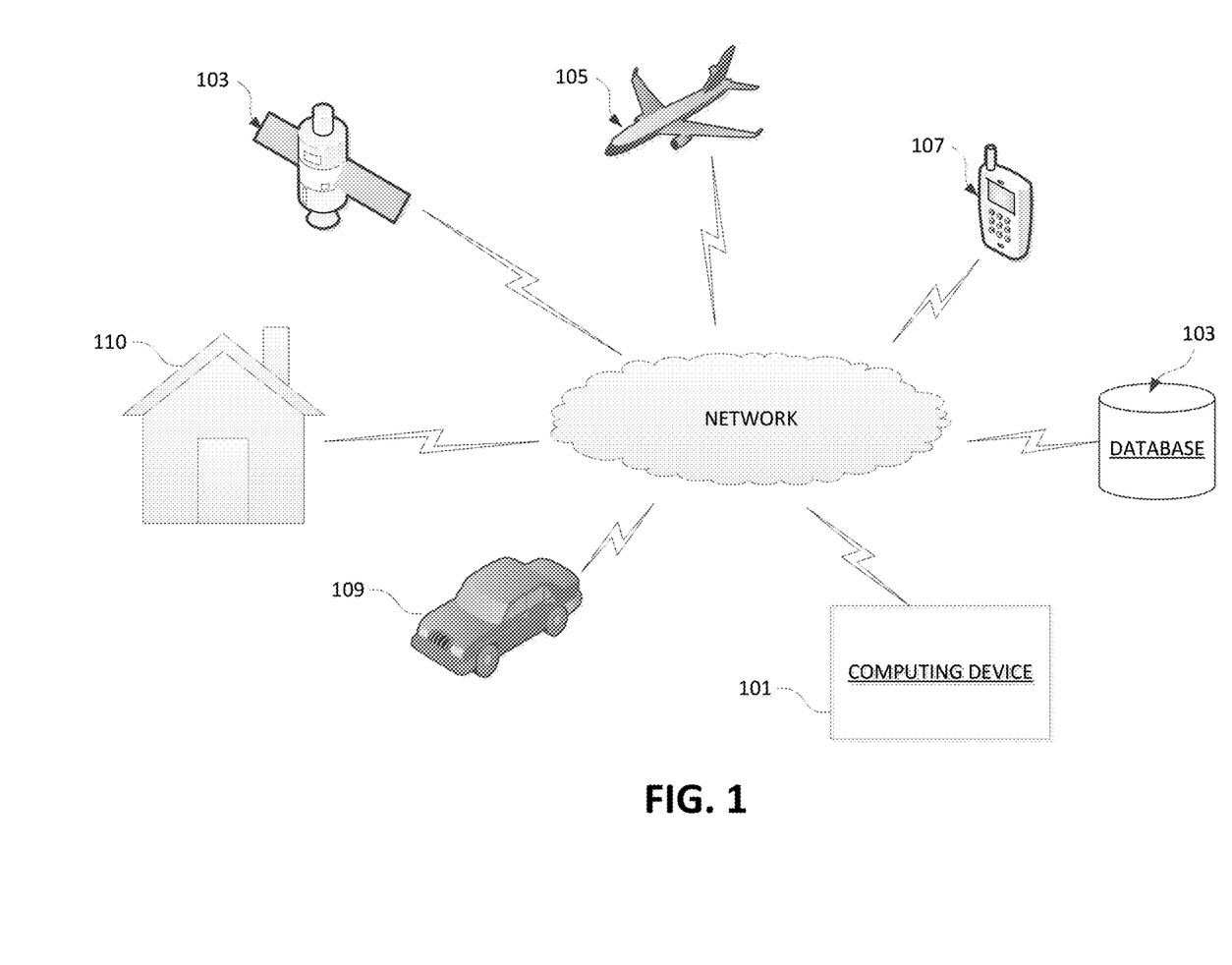
FIG. 1 illustrates a network system in which imaging devices may provide aerial images to one or more ground-based computer devices according to one or more aspects of the disclosure.

FIG. 1 illustrates a system in which aerial or space-based imagery may be obtained and analyzed to enhance processes in an insurance context. System 100 includes a ground-based computing device 101 configured to perform image analysis and insurance processing. As discussed above, the computing device 101 may be an insurance server in one example that generates quotes, identifies marketing targets, generates marketing material, processes claim requests and adjusts insurance premiums, among other tasks. Computing device 101 may be connected to one or more networks including local area network and wide area networks such as the Internet. The networks may be private or public or a combination (e.g., some segments being private while others are public). Further details of an example computer that may serve as the computing device 101 are described below with respect to FIG. 2.

Computing device 101 may be configured to obtain the aerial or space-based imagery directly or indirectly from a variety of devices, including satellite 103, drone 105 and other manned or unmanned aircraft (e.g., plane, helicopter, blimp, weather balloon, etc.). Direct arrangements may allow the computing device 101 to request and obtain images directly from the imaging device. In one example, the computing device 101 may have on-demand access to imagery. That is, the device, such as satellite 103 or drone 105 may capture the requested image in response to the request. In other, in-direct arrangements, the computing device 101 may send requests for imagery to an image warehouse that stores images generated by the imaging devices 103 and/or 105. Image warehouses may store images that are captured based on a specified schedule (e.g., every day, week, hour, 30 minutes, other periodic schedules or aperiodic timelines).

Imagery captured by devices 103, 105 and others include building 110 detail, including roof images, side pictures (e.g., showing windows, siding, doors) and the like. In particular, the imagery from devices 103 and 105 may provide details of high areas or upward facing portions of building 110 that are difficult to view from the ground. Some images may be captured to an inch-level, centimeter-level or millimeter-level of detail. This allows for the computing device 101 to evaluate a variety of features including texture, material, age and the like. Additionally, devices 103 and 105 may be equipped to capture images from a variety of positions and angles. For example, some texture or detail may only be visible at more acute angles, while other types of detail (e.g., depth of holes/damage, area) might be better viewed or determined from a more obtuse angle (e.g., a more direct top-down view). Computing device 101 may dictate which angles and/or positions are desired based on a variety of factors including time of day, weather, building density, foliage and the like. Devices 103 and 105 may have a variety of image sensors and sensors of other types. For example, devices 103 and 105 may include infrared imaging sensors, temperature sensors, sonar, laser imaging and measurement devices, and the like. Accordingly, the captured image and data provided to computing device 101 may include multiple images and/or sets of data depending on need.

In one or more examples, the computing device 101 may also control the amount, type and/or quality of the images and/or data obtained. In one example, if the computing device 101 is aware of particular weather or environmental conditions such as acid raid or salt water, the computing device 101 may request an image of higher resolution to be able to ascertain more minute damage. In other examples, areas having significant sunny weather may call for thermal or infrared imaging to observe heat or radiation related damage. In still another example, the computing device 101 may request a larger number of images in areas having a history of more frequency severe weather (versus a smaller number of images for areas having a less frequency history of severe weather).

Computing device 101 may be further configured to supplement the images and data provided by devices 103 and 105 with data from other sources. In one arrangement, computing device 101 may retrieve property data (values, purchase date, repair information, etc.), material information, demographic information and the like from one or more databases 113. These databases 113 may be supplied internally by an insurance entity or may be externally available through one or more providers, including governmental databases and private servers. In other examples, data from a user device 107 such as phones, tablets, wearables and the like may be used for information including weather, interests and demographics. Computing device 101 may further obtain information from vehicles such as ground vehicle 109. Ground vehicle 109 may be equipped with transponders or other types of monitoring and communication devices that collect and supply data such as vehicle type (sedan, truck, electric vehicle, etc.), speed, break usage, service codes, rate of acceleration, and the like. Ways in which such supplemental information may be used are described in further detail below. In still other examples, the building 110 may include one or more smart components or monitoring devices configured to generate and provide building data. A smart roof, for instance, may be configured to report certain types of information such as age, weather (e.g., type of precipitation) and/or damage. This data may be used to supplemental image data received from aerial image capture devices 103 and 105 or vice versa.

Figure 2:
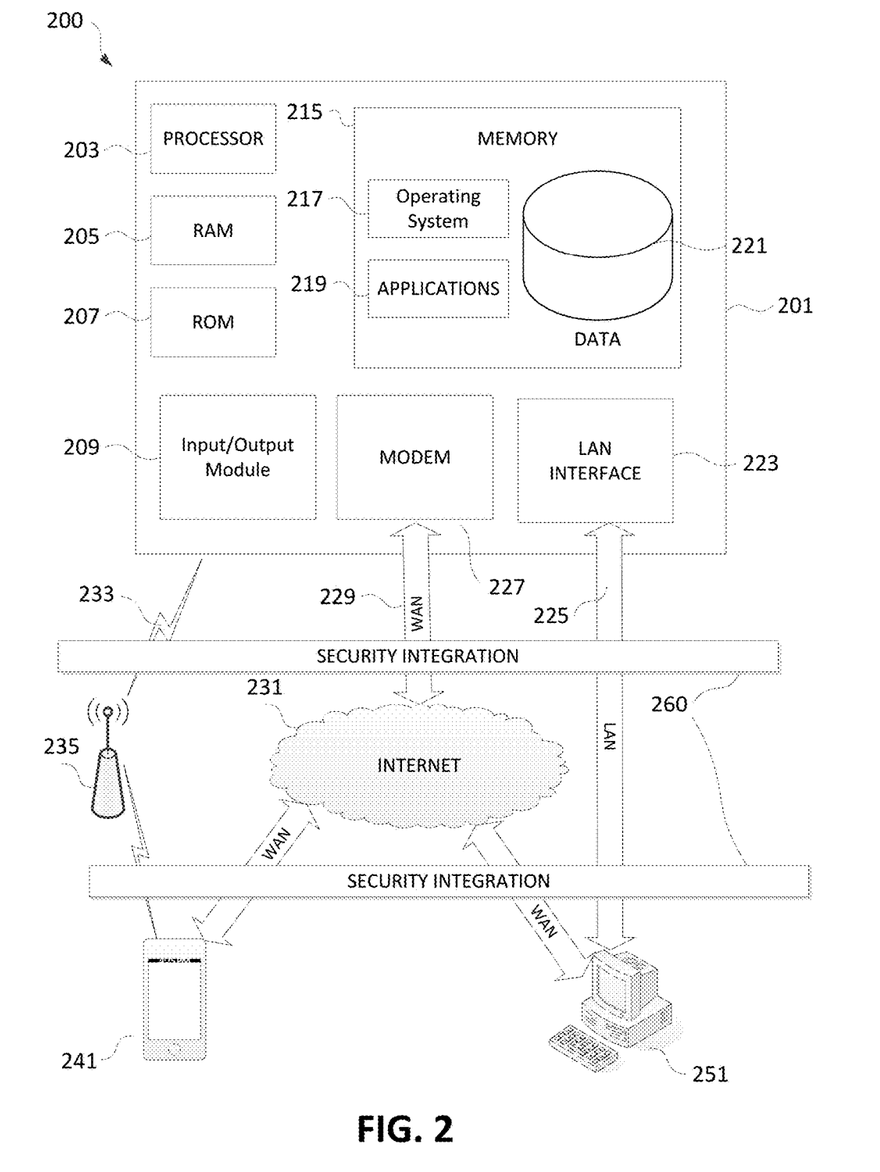
FIG. 2 illustrates an example computing device that may be used in or to implement one or more aspects described herein.

FIG. 2 illustrates a block diagram of a computing device (or system) 201 in a computer system 200 that may be used according to one or more illustrative embodiments of the disclosure. In one example, computing device 101 of FIG. 1 may include a structure similar to that of device 201 shown in FIG. 2. With continued reference to FIG. 2, the device 201 may have a processor 203 for controlling overall operation of the device 201 and its associated components, including RAM 205, ROM 207, input/output module 209, and memory 215. The computing device 201 may correspond to any of multiple systems or devices described herein, such as personal mobile devices, satellite, aircraft systems, ground vehicle-based computing devices, insurance servers, home computing devices, external data sources and other various devices. These various computing systems may be configured individually or in combination, as described herein, for capturing aerial/spaced-based images, analyzing attributes of a building using the images, calculating quotes for insurance, determining insurance risks, formulating marketing strategies (e.g., selecting advertisement targets), processing claims, monitoring post-claim repairs, adjusting insurance premiums and the like.

Input/Output (I/O) 209 may include a microphone, keypad, touch screen, and/or stylus through which a user of the computing device 201 may provide input, and may also include one or more of a speaker for providing audio output and a video display device for providing textual, audiovisual and/or graphical output. Software may be stored within memory 215 and/or storage to provide instructions to processor 203 for enabling device 201 to perform various actions. For example, memory 215 may store software used by the device 201, such as an operating system 217, application programs 219, and an associated internal database 221. The various hardware memory units in memory 215 may include volatile and nonvolatile, removable and non-removable media implemented in any method or technology for storage of information such as computer-readable instructions, data structures, program modules or other data. Certain devices and systems within an image processing and insurance system may have minimum hardware requirements in order to support sufficient storage capacity, processing power, analytical ability (e.g., image processing software/hardware), network communication, etc. For instance, in some embodiments, one or more nonvolatile hardware memory units having a minimum size (e.g., at least 10 gigabytes (GB), 200 GB, 500 GB, etc.), and/or one or more volatile hardware memory units having a minimum size (e.g., 1 GB, 8 GB, 32 GB etc.) in order to collect and analyze image data, property data, owner data, insurance data, identify targets of marketing campaigns, evaluate insurance risks, process claims and other tasks. Memory 215 also may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Processor 203 may include a single central processing unit (CPU), which may be a single-core or multi-core processor (e.g., dual-core, quad-core, etc.), or may include multiple CPUs. Processor(s) 203 may have various bit sizes (e.g., 16-bit, 32-bit, 64-bit, 96-bit, 128-bit, etc.) and various processor speeds (ranging from 100 MHz to 5 Ghz or faster). Processor(s) 203 and its associated components may allow the system 201 to execute a series of computer-readable instructions, for example, request images, determine geographic locations to image, evaluate area penetration, determine property characteristics using image analysis, risk calculation, claim analysis and repair monitoring.

A computing device such as device 201 (e.g., a personal mobile device, vehicle-based system, insurance server, etc.) may operate in a networked environment 200 supporting connections to one or more remote computers or devices (e.g., satellites, remote servers, drones, vehicles, personal devices). The network connections depicted in FIG. 2 include a local area network (LAN) 225 and a wide area network (WAN) 229, and a wireless telecommunications network 233, but may also include other networks. When used in a LAN networking environment, the computing device 201 may be connected to the LAN 225 through a network interface or adapter 223. When used in a WAN networking environment, the device 201 may include a modem 227 or other means for establishing communications over the WAN 229, such as network 231 (e.g., the Internet). When used in a wireless telecommunications network 233, the device 201 may include one or more transceivers, digital signal processors, and additional circuitry and software for communicating with wireless computing devices 241 and 251 (e.g., mobile phones, portable customer computing devices, vehicle-based computing devices and systems, etc.) via one or more network devices 235 (e.g., base transceiver stations) in the wireless network 233.

Also illustrated in FIG. 2 is a security layer 260, through which communications may be sent and managed between the device 201 and remote devices. For example, images or other data received from satellites or drones, or from other sources such as a government database may be secured to insure privacy. The security layer 260 may comprise one or more separate computing devices, such as web servers, authentication servers, and/or various networking components (e.g., firewalls, routers, gateways, load balancers, etc.), having some or all of the elements described above with respect to the computing device 201. In other examples, security layer 260 may correspond to software or hardware (e.g., encryption) within the device 201. Encryption protocols may also be implemented through security layer 260. Types of encryption may include public/private key pairs, Advanced Encryption Standard (AES) algorithms, Data Encryption Standard (DES) algorithms and other symmetric and asymmetric encryption protocols. Additionally or alternatively, security layer 260 may provide virtual private network (VPN) connections (e.g., using SSL or the like) through which certain types of data is sent to and received from other devices in the system.

Although not shown in FIG. 2, various elements within memory 215 or other components in system 100, may include one or more caches, for example, CPU caches used by the processing unit 203, page caches used by the operating system 217, disk caches of a hard drive, and/or database caches used to cache content from database 221. For embodiments including a CPU cache, the CPU cache may be used by one or more processors in the processing unit 203 to reduce memory latency and access time. In such examples, a processor 203 may retrieve data from or write data to the CPU cache rather than reading/writing to memory 215, which may improve the speed of these operations. In some examples, a database cache may be created in which certain data from a database 221 (e.g., a database of property data, user data, user/owner interests or characteristics, etc.) is cached in a separate smaller database on an application server separate from the database server (e.g., at a personal mobile device, insurance processing device, or intermediary network device or cache device, etc.). For instance, in a multi-tiered application, a database cache on an application server can reduce data retrieval and data manipulation time by not needing to communicate over a network with a back-end database server.

As noted above, computing device 201 includes a processor 203. In some examples, the computing device 201 may include additional processors (not shown) dedicated to image and/or video processing. Since computing device 201 may be tasked with processing images to identify various characteristics of a building or other property, computing device 201 may require additional processing power for purposes of efficiency and speed. Moreover, when processing video, even more processing power may be required to achieve the requisite level of speed and responsiveness. In some examples, processor 203 may be a multi-core device that has dedicated cores for various types of tasks including image and video processing. Accordingly, such multi-core processors may be used in addition to or instead of a multi-processor system. In yet other examples, video and image processing (or other types of tasks) may be performed in a cloud-based environment where one or more computing devices contribute to the processing capability.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in home maintenance monitoring and reward system components described herein may be configured to communicate using any of these network protocols or technologies.

An image-based insurance processing system may provide services that can be largely categorized into three areas: marketing, claim processing and post-claim processing. Each of these services may achieve greater efficiencies by using current and, in some cases, on-demand imagery of the subject structure or building. For example, current imagery may refer to images captured within a predefined time period (e.g., within a number of hours, days, months, etc.) of a triggering event. A triggering event may include, but is not limited to, occurrence of damage, request for quote, initiation of a marketing campaign, customer drive, start of a climate season, other time of year (e.g., holiday, month, etc.) and the like and/or combinations thereof. The following description provides example processes by which these services may be executed.

Figure 3:
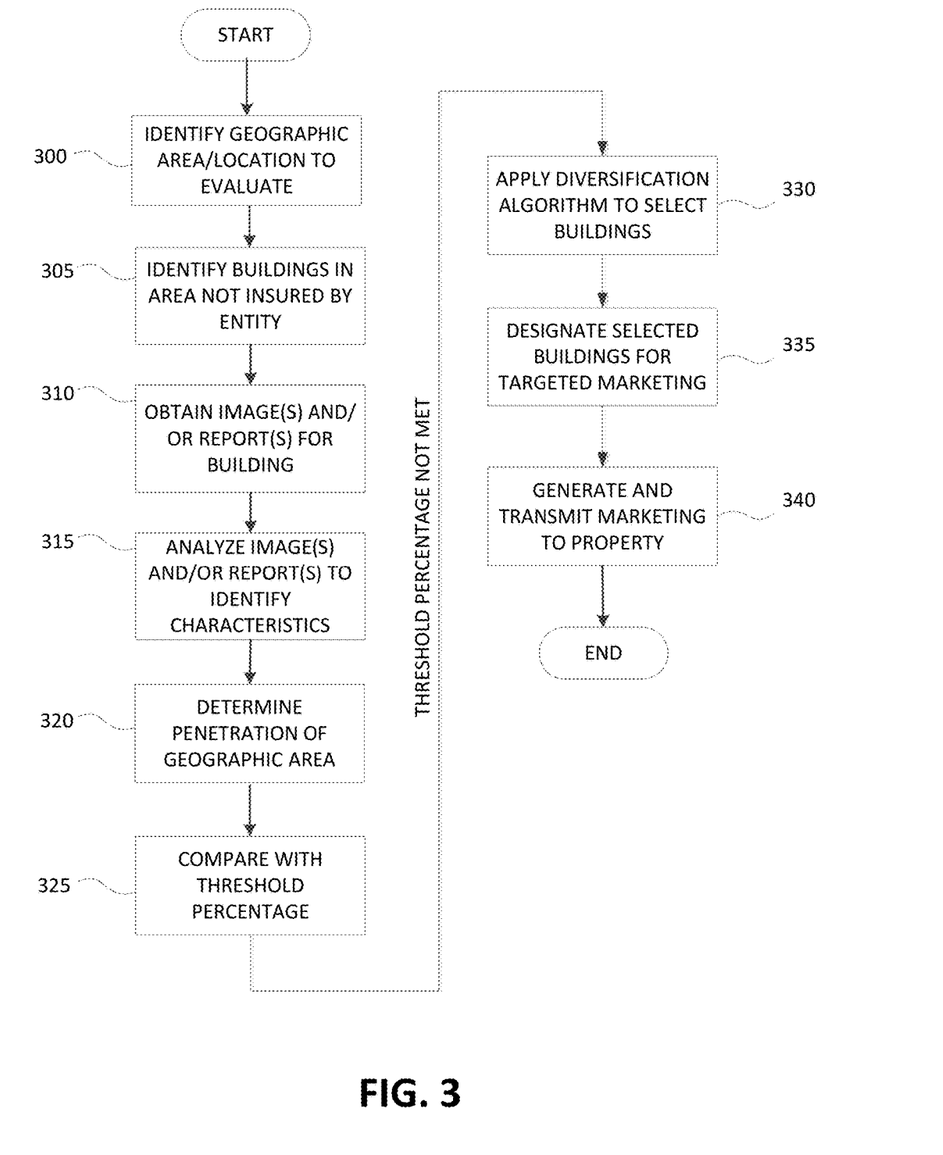
FIG. 3 is a flowchart illustrating an example process for image-based identification of potential marketing targets using various information generated via image analysis according to one or more aspects of the disclosure.

FIG. 3 illustrates an example process by which an image-based insurance system may conduct risk-based marketing analyses to identify targets to which to market insurance products. In step 300, an image-based insurance system may identify a geographic location to evaluate marketing opportunities. The identification of this geographic location may be performed in a variety of ways and take into account a host of factors. In some examples, the predefined target area or areas may be defined by areas of low penetration, by areas where one or more potential customers have requested quotes, by risk (e.g., potential for types of weather, types of damage, etc.), by property values and the like and/or combinations thereof. In one example, a marketing analysis may be conducted to determine zip codes where an insurance entity has low coverage (e.g., percentage of homes in the zip code covered by the insurance entity). In another example, an insurance entity may select an area or areas (zip codes, area codes, 5-mile radius, etc.) from which a building owner or other entity associated with the building has requested an insurance quote. In still another example, the insurance system may select areas in which the risk of damage of one or more types is a threshold percentage or lower. These are merely examples and the above-noted factors and/or other factors may be considered in combination or individually.

In further examples, the identification of desirable geographic areas for imaging may involve cross-referencing predefined target areas with a current location and/or expected location of an imaging device such as a satellite or drone. From another perspective, the identification may cross-reference the predefined target areas with an expected time to image (e.g., expected time of arrival at an imaging position for that area), which may, in turn, taken into account the current location and speed of the imaging device. The target area (of the predefined target areas) that is imageable first in time may then be selected as the geographic location to evaluate. Of course, a schedule may also be defined to maximize the recency of the images captured for each of the target areas. Using such a process may be helpful in obtaining the most recent images possible of a particular area or of structures within that area.

In step 305, the insurance processing system may identify or otherwise determine buildings in the selected geographic area that are not currently insured by the insurance entity. In some examples, this step may be performed prior to step 300 (e.g., as part of determining the predefined target areas). The determination of step 305 may include cross-referencing the properties within the selected geographic area with an internal database of customers maintained by the insurance entity. Alternatively or additionally, external databases or sources may be consulted for insurance data for each property.

Once the properties that are not currently insured by the insurance entity within the geographic area are identified, the insurance processing system may then perform steps 310 and 315 for each of the identified properties. In particular, in step 310, the insurance processing system may request or otherwise obtain one or more images and reports for the property not insured by the insurance entity. As described herein, the image or images may be obtained from an imaging device that includes a space-based or aerial image sensor. In the context of homeowner insurance and, in particular, roof insurance, the processing system may request images at varying angles and/or positions (e.g., north, south, east, west, etc.) of the home and roof. In some examples, the insurance processing system may have a default setting for the number of images and the angles and positions for each image. In other examples, the insurance processing system may obtain property data to determine a number of images needed, and the angles or positions desired. In a particular example, two story houses may require images at a first set of angles or positions while single story homes might require images at a second set of angles or positions different from those of two story structures. In another example, a split-level home may require more images at more angles or positions than a two story home. In some examples, these images may be captured by the imaging device on-demand (captured in response to the request) while in other examples, these images may be previously captured and provided from an image warehouse.

In some arrangements, the insurance processing system may perform image analysis on the obtained image or images to determine characteristics of the roof and home in step 315. For example, an image processor chip may be tasked with performing image analysis on the image or group of images. These characteristics may include roof type (e.g., material), roof age and pitch or slope. Other characteristics may include roof shape, whether the roof has damage or is otherwise worn and the like. Various image analysis techniques may be used to determine this information. For example, edge detection may be used to determine a pitch and total area/size of the roof, while contrast analysis may help determine roof age and/or type (e.g., by identifying texture). Specifically, edge detection may assist in identify the boundaries of a roof and/or the edges of individual shingles. Contrast detection may identify changes in tone or color to define the texture of a particular roof material. Still further, thermal imaging may also be used to determine roof age or type. For example, different types of roof materials may have different heat absorption patterns or characteristics. Texture or age may also be revealed using sonar or infrared imaging.

Figure 4A:
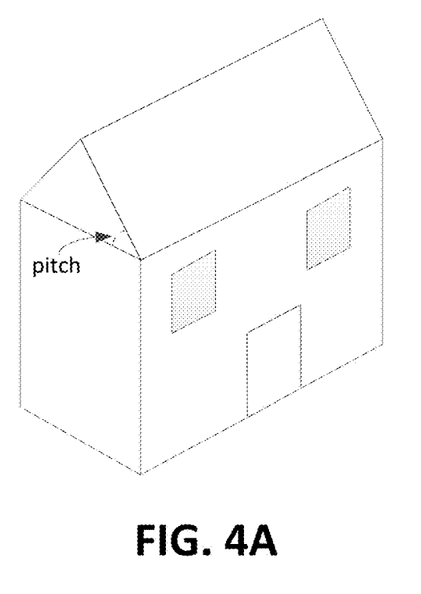
FIGS. 4A and 4B illustrate example aerial images of a building and roof according to one or more aspects of the disclosure.
Figure 4B:
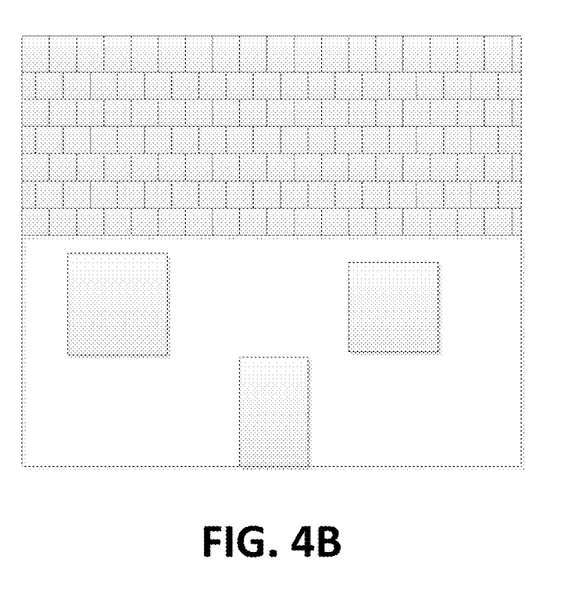

FIGS. 4A and 4B are illustrative examples of roof and building images. For example, FIG. 4A illustrates an image at a first angle and position relative to a roof of a house. From this angle, the pitch of the roof may be determined. In FIG. 4B, an image is taken from another angle, such that a planar surface of the roof is captured. From this angle and image, a roof type may be identified. For example, the image may show asphalt or slate/tile shingles, dimensional versus standard flat shingles and the like. In another example, the roof may be composed of metal, which may be determined from a reflectivity of the roof surface shown in the captured image. From the various images, existing damage or wear may also be ascertained.

Referring again to FIG. 3, additionally or alternatively to step 315, one or more of the roof properties may be determined by the imaging device or system and returned to the insurance processing system as part of a report analyzing the captured images. For example, the insurance processing system might request not only the images, but also a report comprising characteristics associated with the imaged roof. This data may include roof type, roof size, property age, siding type, property type, roof age and/or roof pitch. In such instances, the processing system may confirm the data from the imaging device or system by performing its own analysis of the images (different from or similar to the above image processing of step 315).

After identifying the roof characteristics, the insurance processing system may determine whether an area penetration exceeds a specified threshold penetration. Area penetration may refer to a percentage of buildings or structures having a particular characteristic. In this insurance-based example, this characteristic may include weather the building or structure (or roof thereof) is insured by the insurance entity. In the example of step 320, the insurance processing system may determine a percentage of buildings (e.g., homes) in the geographic area insured by the insurance entity. The insurance processing system may then compare this percentage to a maximum percentage desired in step 325. In the insurance area, 100% coverage of homes in a specified area is not desirable, as this increases risk of exposure. Accordingly, it is generally more preferable to insure some range of homes (e.g., 50%) in two different areas than 100% of homes in a single area.

If the area penetration is less than the specified threshold (as determined from step 325), the insurance processing system may then select particular properties within the geographic area to target for insurance coverage based on a risk diversification algorithm in step 330. An example risk diversification algorithm is described in further detail with respect to FIG. 5. In step 335, once the particular properties have been selected from within the geographic area, the system may designate these properties for targeted marketing for insurance products and coverage. In one or more examples, this targeted marketing may include generating and transmitting advertisements and/or other material specific and/or unique to each of the designated properties (e.g., general insurance quotes, letters addressed to owner of record, etc.) as shown in step 340. The transmission may be electronic, e.g., to a messaging address registered for that property. Moreover, the message may be automatically populated with one or more of the captured images as well as a quote, a link to a property-specific quote or a link to a property-specific interface through which a user may request a quote or more detailed quote.

If, on the other hand, the area penetration meets or exceeds the threshold, no further action might be taken for properties/buildings in that geographic area. Alternatively, the diversification algorithm may still be applied and the area penetration taken as one factor in the algorithm.

Figure 5:
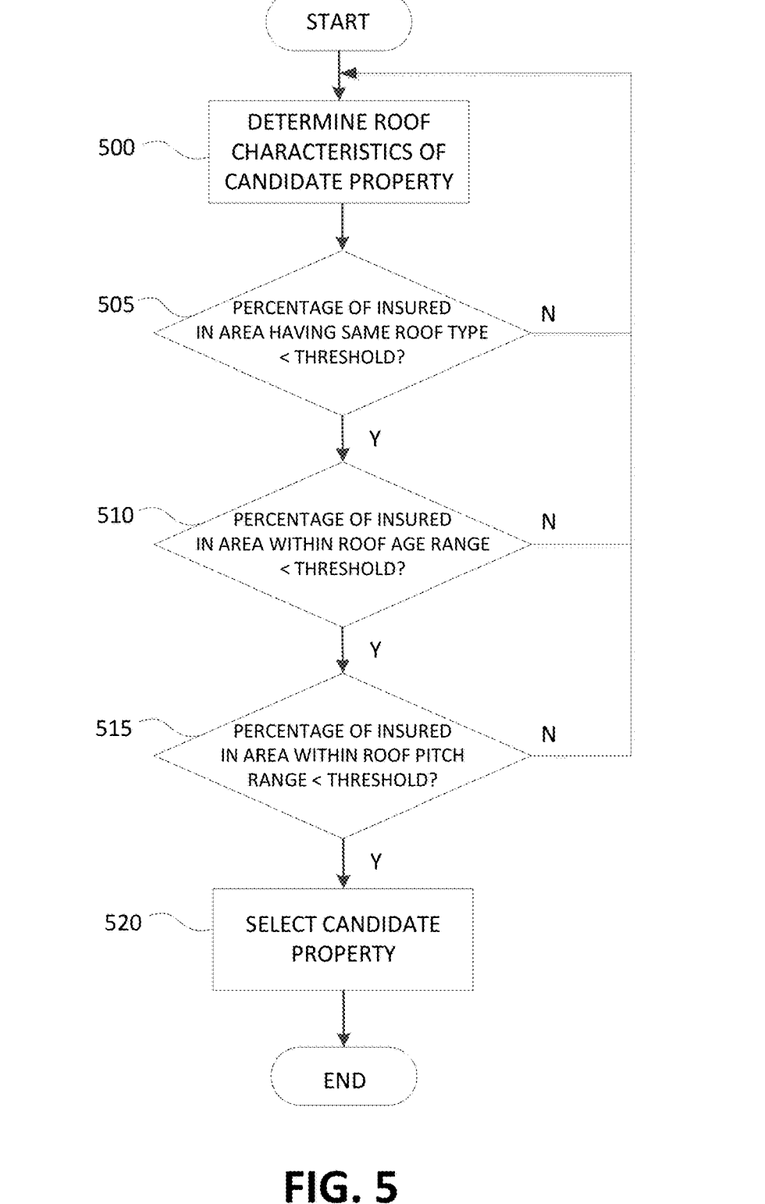
FIG. 5 is a flowchart illustrating an example risk diversification process according to one or more aspects of the disclosure.

FIG. 5 illustrates an example property selection process using a risk diversification algorithm. In step 500, the roof characteristics of a candidate property (e.g., a property not currently insured by the insurance entity) are determined. Whether the property is selected for targeted marketing may then be determined based on whether risk is diversified for each of these characteristics. For example, for roof type, the system may determine whether a percentage of properties in the geographic area having that same roof type is below a certain threshold in step 505. For roof age, the system may determine whether a percentage of properties in the geographic area having an age within an age range encompassing the determined roof age of the candidate property is below a certain threshold in step 510. In a particular example, the age range may be 1-3 years. Similarly, the system may also determine whether a percentage of properties in the geographic area having a roof pitch within a pitch range (e.g., encompassing the determined roof pitch of the candidate property) is below a certain threshold in step 515.

If the system determines that diversification of all characteristics is satisfied, the system may select the candidate property for targeted marketing in step 520. The thresholds for each of the characteristics may vary between different values of that characteristic. For example, a threshold percentage of a first roof type may be 60% while the threshold percentage of a second roof type may be 50%. Similarly, the threshold for a first age range may be different from a threshold for a second age range. Thresholds may also vary from area to area and depend on factors such as weather (e.g., susceptibility to various types of inclement weather). In some cases, the system may set other parameters for selecting a candidate property for targeted marketing. For example, the system might only require diversification for a majority (or other percentage, e.g., 75%, 66%, 33%, etc.) of characteristics. In another example, the system might only require diversification of certain predefined characteristics. Additionally, fewer, more and/or different characteristics may be evaluated for diversification purposes.

Diversification as described in FIG. 5 is evaluated for a population within the geographic area. However, diversification may also be analyzed for a population comprising all insured properties of the insurance entity. In another example, diversification may be determined against a population of all insured properties within a state, a city, other jurisdictions, other areas and the like. In yet other examples, diversification may factor in user demographics such as homeowner age.

Aerial imagery is useful in not only the context of marketing and identifying potential customers, but is also applicable to claims processing for existing customers. For example, when processing a claim and arranging for a claims adjuster to conduct a further inspection or otherwise confirm findings based on remote imagery, the imaging information may be used to identify appropriate equipment or procedures to satisfy requirements. In some examples, the system may automatically dispatch or schedule the required equipment and/or personnel.

Figure 6:
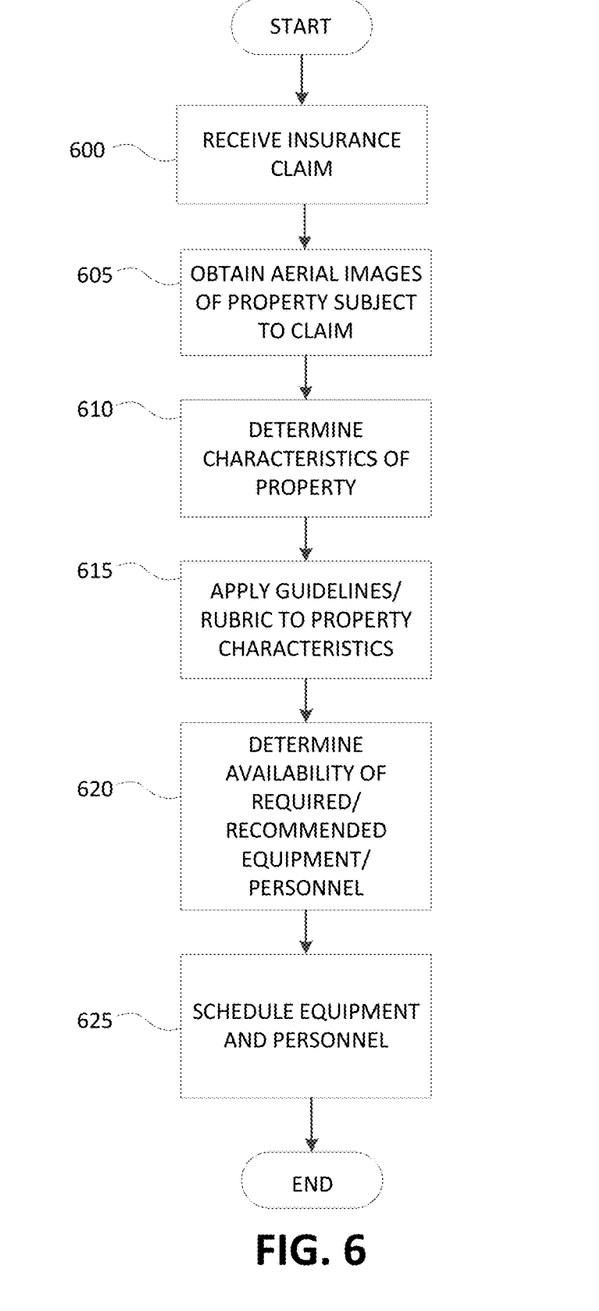
FIG. 6 is a flowchart illustrating an example claims processing method according to one or more aspects of the disclosure.

FIG. 6 illustrates an example claims processing method in which images may be analyzed to identify requisite processing equipment and procedures. In step 600, an image-based insurance processing system may receive a claim for insurance. In a particular example, the claim may relate to damage to a homeowner's roof. The claim information may include a type of damage, an estimated repair/replacement cost, and customer information including name, contact information and location. In step 605, the processing system may use the location information received as part of the claim to request and obtain one or more aerial images from an imaging device. As described herein, the imaging device may be part of an aircraft or a space-based craft. The processing system may specify a number of views, angles and perspectives for the images to be obtained. In some cases, the images may be captured on-demand (e.g., in response to request) or may be captured prior to the request being received. For example, the images may be captured based on a specified schedule (irrespective of a specific request) and stored in an image warehouse for later retrieval. Accordingly, some images may be hours, days or months old. In the case of on-demand image capture, the acquisition of the image might not be immediate. That is, there may be delay between the request for the image of the specified location and the actual time of capture, depending on various factors including the position of the imaging device and a speed of travel/estimated time of arrival at a position where the device is able to capture an image of the specified location.

Upon receiving the image or images, the processing system may determine one or more characteristics associated with the damage or structure subject to the claim in step 610. These characteristics may include roof age, roof type, roof pitch/slope, number of stories, roof shape, roof square footage, extent of damage, type of damage, water hazards, area vegetation, existence of solar panels or other roof features, other roof issues (rotting, water damage, moss/vegetation, patched roof, sagging/bowed roof) and the like. In step 615, the processing system may apply a rubric or set of guidelines specifying the types of equipment and/or procedures that may be required to the determined roof and/or property characteristics. For example, certain government guidelines such as Occupational Safety and Health Administration (OSHA) regulations, and/or federal and state laws may require the use of harnesses or certain types of ladder when a structure is two stories or higher. Some regulations may also require that the claims adjuster or inspector have a certain type of certification or have undergone particular training for certain types of situations. In another example, company regulations may require that claims adjusters follow a particular reporting procedure (e.g., video documentation, reporting via telephone every 30 minutes, etc.) when inspecting roofs of a range of roof pitch. In yet other examples, a bucket truck may be required due to the height of the building. Accordingly, these requirements and/or recommended equipment and/or procedures may be identified through a set of rules.

In step 620, the processing system may determine the availability of the required or recommended equipment as well as the availability of claims adjusters (or other damage inspectors) that fit a recommended profile. In step 625, the processing system may then schedule the equipment and personnel. In one example, the processing system may generate alerts and send those alerts the appropriate destinations. Alerts may include text messages, multi-media messages, telephone calls, e-mails, voice messages and the like and/or combinations thereof.

Figure 7:
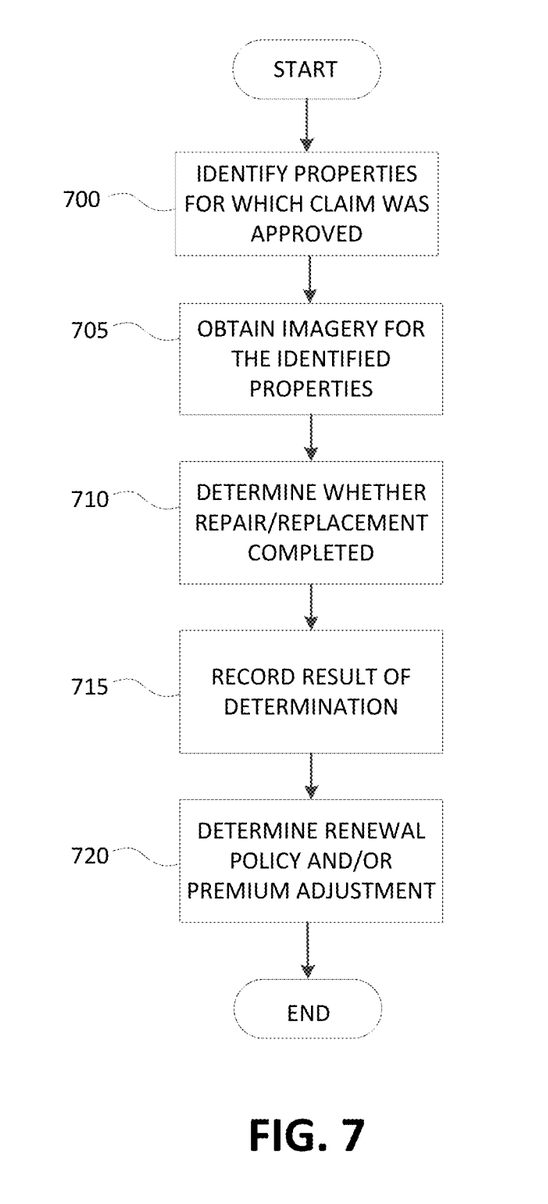
FIG. 7 is a flowchart illustrating an example post-claim processing and renewal method according to one or more aspects of the disclosure.

FIG. 7 illustrates an example post-claim approval process, whereby the insurance processing system may monitor repairs and determine the necessity and amount of a premium adjustment. Again, as with marketing and claims processing, aerial imagery of a property may be used. In step 700, the processing system may identify properties for which a claim has been approved for repair or replacement of a roof. In step 705, the processing system may request or otherwise obtain imagery for one or more of those properties to evaluate whether repairs have been completed. The imagery may be requested from one or more aerial/space-based imagery systems or devices. In step 710, upon receipt of the imagery, the processing system may determine whether repairs have been completed for the damage claimed. This determination may be made through a report from the imaging system (e.g., the aerial or space-based imagery device) or may be determined using various image analysis techniques as described herein.

In step 715, whether repairs have been affected may be recorded in a database for further evaluation and use. For example, in step 720, the processing system may use historical repair information during a renewal or other premium adjustment analysis event. In some arrangements, a premium may be increased or increased a larger amount if a repair was never affected or confirmed. Alternatively, renewal may be rejected in such a case. Such a policy may reflect the inability or difficulty to subsequently differentiate between new or old damage, thereby skewing a risk analysis. Renewal or premium amounts may also be adjusted based on other factors including a cost associated with dispatching claim adjusters. For example, claim adjusters with particular certifications or training may be assigned or otherwise associated with a greater cost. Similarly, certain types of equipment needed for inspection purposes might also involve additional cost. Accordingly, these costs may be incorporated into or otherwise reflected in the insurance premium or adjustment thereto.

Figure 8:
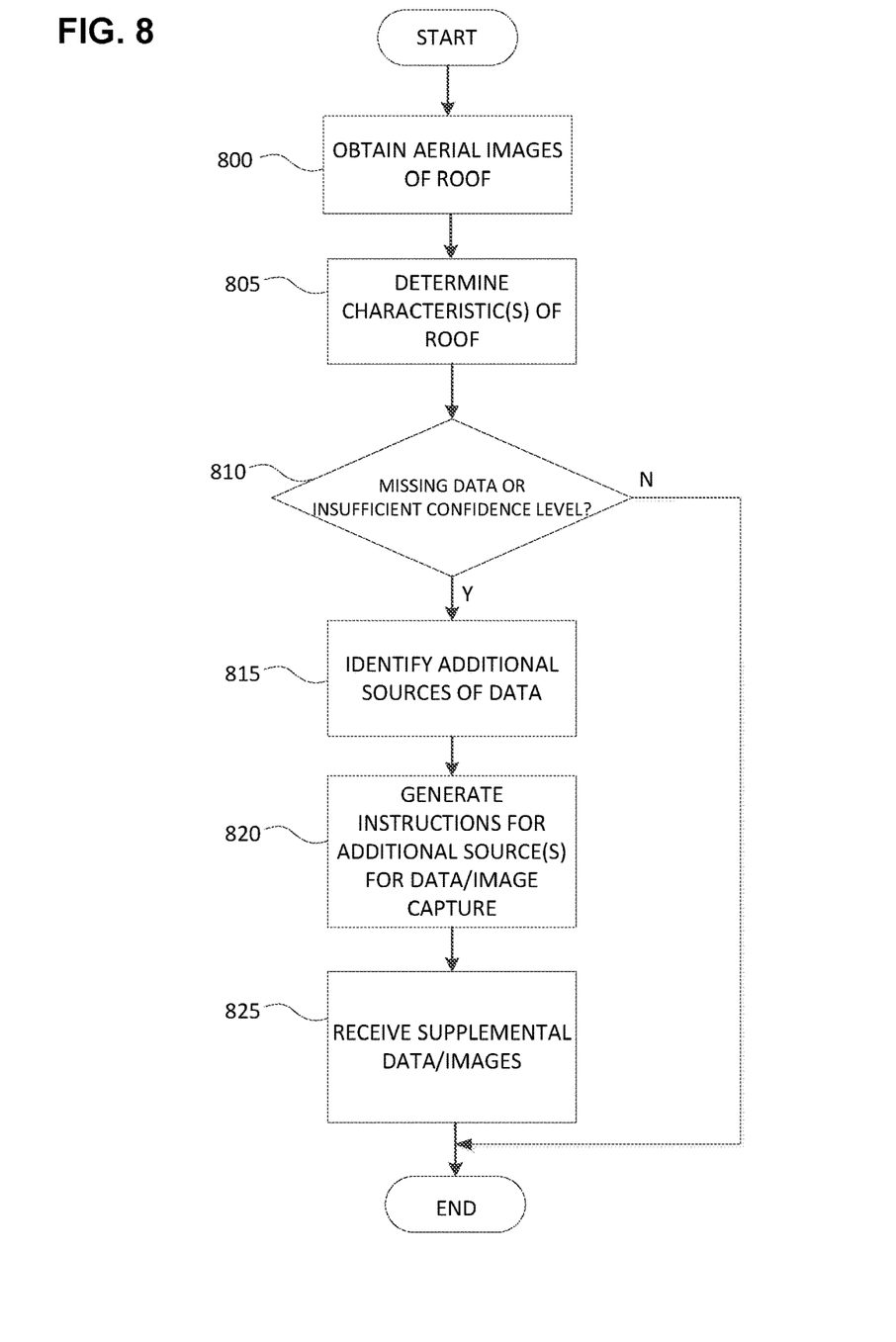
FIG. 8 is a flowchart illustrating an example process for obtaining supplemental image or analytics according to one or more aspects of the disclosure.

While the above description provides for image-based insurance processing using aerial images, this information and processing may be supplemented using other image data. For example, images from a user's phone or ground-based vehicle imagery may also be analyzed in conjunction with the aerial images to confirm findings, to distinguish further levels of detail, and/or to generate further conclusions regarding a structure. In some examples, an image-based insurance processing system may be configured to coordinate the collection of information, as shown in the example process of FIG. 8. In step 800 of FIG. 8, an insurance processing system may obtain aerial images of a building roof. From the image, the system may determine one or more characteristics of the roof such as orientation, size, pitch and the like in step 805. In step 810, the system may determine whether any information is missing or if a characteristic has been determined with less than a threshold level of confidence. For example, if the image capture device is unable to determine the pitch with greater than 50% confidence, the processing system may determine that the information is unreliable. Alternatively or additionally, if the image capture device or the processing system determines that a roof type was not discernible, the processing system may identify the roof type as a missing characteristic.

If the system determines that information is unreliable or missing, the system may identify additional sources of data for the missing information in step 815. For example, the system may determine that cell phone image capture is available through a user's registered phone. Alternatively, the system may determine that ground vehicle based images are available of the structure through a third-party source (e.g., Google Street View). In step 820, the system may generate instructions for a remote device to capture an image of the structure. In the example of a user device, the processing system may send instructions to an application executing on the user device directing the camera to a particular location, angle, tilt, time for image capture. These parameters may be derived from the aerial images received in step 800. If, for instance, an aerial image shows one angle of the roof, but obscures a part or all of the damage, the processing system may calculate an appropriate angle or angles to supplement the image so that the damage may be more fully evaluated. In other examples, the processing system may direct an autonomous device (e.g., a drone, a vehicle) to capture an image based on the aforementioned parameters. While supplemental non-aerial images are described with respect to FIG. 8, the processing system may also seek supplemental aerial images such as from autonomous and non-autonomous vehicles such as drones, aircraft, satellites, street cameras and the like. In step 825, the processing system may receive the supplemental image information as well as additional analytics. This additional information may then be used in any of the processes described herein to assist in analyzing insurance-based tasks.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, the processes, systems, apparatuses and other aspects of the present disclosure have been described with respect to insurance processing for buildings. However, the same or similar features may be applied to a variety of contexts including product sales, service offerings, real estate and the like.

What is claimed is:

1. An image processing system comprising:
   an imaging device, the imaging device including at least one of a space-based aerial image sensor and an aerial image sensor; and
   a ground-based digital image processing device comprising:
      a processor; and
      memory storing computer readable instructions that, when executed by the processor, cause the ground-based digital image processing device to:
         project, by the processor of the ground-based image processing device, an expected position of the imaging device;
         determine, by the processor of the ground-based image processing device, and for a specified geographic region corresponding to the expected position of the imaging device, a plurality of real estate properties not currently insured by a specified insurance entity, and for each of the determined real estate properties in the geographic region not currently insured by the specified insurance entity:
            determine, by the processor of the ground-based digital image processing device, one or more digital image capture parameters based on at least one of: a weather condition, type of object to be imaged, and property density, the parameters including a type of sensor to use;
            instruct the imaging device to capture a digital image specific to a respective one of the determined real estate properties from the imaging device, the instruction including the one or more capture parameters for capturing the digital image;
            perform, by the processor of the ground-based digital image processing device, image analysis on the image to determine one or more of: whether a roof pitch is within a predetermined pitch range by performing edge detection, a roof material type and a roof age of the respective one of the determined real estate properties, including applying a contrast filter to determine the roof age and roof material type;
            determine, by the processor of the ground-based digital image processing device, whether to target any of the determined real estate properties based on a determined percentage of properties in the geographic region insured by the specified insurance entity; and
            in a case where the ground-based image processing device determines that at least one of the determined real estate properties are to be targeted:
               selecting, by the processor of the ground-based digital image processing device, the at least one of the determined real estate properties using a combination of the roof type, the roof pitch and the roof age determined through the image analysis performed by the ground-based digital image processing device; and
               designating the at least one of the determined real estate properties to receive home insurance information.

2. The image processing system of claim 1, wherein performing the image analysis further includes at least one of: texture analysis and color determination.

3. The image processing system of claim 1, wherein determining the digital image capture parameters including specifying the use of a thermal imaging sensor in response to determining that the weather includes sun.

4. The image processing system of claim 1, wherein the digital image capture parameters further includes use of an infrared image sensor.

5. The image processing system of claim 1, wherein digital image capture parameters further includes use of a sonar image sensor.

6. The image processing system of claim 1, wherein determining whether to target any of the determined real estate properties based on a determined percentage includes comparing the determined percentage to a threshold percentage.

7. The image processing system of claim 6, wherein selecting the at least one of the determined real estate properties based on a combination of the roof type, the roof pitch and the roof age, includes:
   determining a first percentage of properties in the geographic region having the roof type, that are insured by the specified insurance entity;
   determining a second percentage of properties in the geographic region having a roof of an age within a specified age range, that are insured by the specified insurance entity;
   determining a third percentage of properties in the geographic region having a roof pitch in a roof pitch range, that are insured by the specified insurance entity; and
   selecting the at least one of the determined real estate properties in a case where the first, second and third percentages do not exceed first, second and third threshold percentages, respectively.

8. The image processing system of claim 7, wherein the first, second and third threshold percentages are defined based on an amount of risk associated with the roof type, the specified roof age range and the specified roof pitch range, respectively.

9. The image processing system of claim 1, wherein the specified geographic region to image is further identified by determining that the geographic region has a percentage of properties insured by the specified insurance entity lower than a specified coverage threshold.

10. A digital image processing apparatus configured to direct and analyze digital images for identification of object characteristics, the apparatus comprising:
    a processor; and
    memory storing computer readable instructions that, when executed by the processor, cause the digital image processing apparatus to:
       project, by the processor of the digital image processing apparatus, an expected position of an aerial digital imaging device;
       determine, by the processor of the digital image processing apparatus, and for a specified geographic region corresponding to the expected position of the imaging device, a plurality of real estate properties not currently insured by a specified insurance entity, and for each of the determined real estate properties in the geographic region not currently insured by the specified insurance entity:
          determine, by the processor of the digital image processing apparatus, one or more digital image capture parameters based on at least one of: a weather condition, type of object to be imaged, and property density, the parameters including a type of sensor to use;

instruct, through a data communication network, the aerial imaging device to capture an image specific to a respective one of the determined real estate properties, the instruction including the one or more capture parameters for capturing the digital image;

perform, by the processor of the digital image processing apparatus, image analysis on the image to determine one or more of: whether a roof pitch is within a predetermined pitch range by performing edge detection, a roof material type and a roof age of the respective one of the determined real estate properties, including applying a contrast filter to determine the roof age and roof material type;

determine, by the processor of the digital image processing apparatus, whether to target any of the determined real estate properties based on a determined percentage of properties in the geographic region insured by the specified insurance entity; and in a case where the image processing apparatus determines that at least one of the determined real estate properties are to be targeted:

selecting, by the processor of the digital image processing apparatus, the at least one of the determined real estate properties based on a combination of the roof material type, the roof pitch and the roof age determined through the image analysis; and designating the at least one of the determined real estate properties to receive home insurance information.

11. The image processing apparatus of claim 10, wherein performing the image analysis further includes at least one of: texture analysis and color determination.

12. The image processing apparatus of claim 10, wherein the image capture parameters include obtaining a thermal image.

13. The image processing apparatus of claim 10, wherein determining whether to target any of the determined real estate properties based on the determined percentage includes comparing the determined percentage to a threshold percentage.

14. The image processing apparatus of claim 13, wherein selecting the at least one of the determined real estate properties based on a combination of the roof material type, the roof pitch and the roof age, includes:

determining a first percentage of properties in the geographic region having the roof material type, that are insured by the specified insurance entity;

determining a second percentage of properties in the geographic region having a roof of an age within a specified age range, that are insured by the specified insurance entity;

determining a third percentage of properties in the geographic region having a roof pitch in a roof pitch range, that are insured by the specified insurance entity; and selecting the at least one of the determined real estate properties in a case where the first, second and third percentages do not exceed first, second and third threshold percentages, respectively.

15. The image processing apparatus of claim 14, wherein the first, second and third threshold percentages are defined based on an amount of risk associated with the roof type, the specified roof age range and the specified roof pitch range, respectively.

16. A digital image processing apparatus configured to direct and analyze digital images, the apparatus comprising:
a processor; and
memory storing computer readable instructions that, when executed by the processor, cause the apparatus to perform:

receiving notification of damage to a roof of a property;

determining a location of the property;

identifying, by the processor of the digital image processing apparatus, an imaging device with which to capture a digital image of the property based on an expected location of the imaging device given a current trajectory and speed;

determine, by the processor of the digital image processing apparatus, one or more digital image capture parameters based on at least one of: a weather condition, type of object to be imaged, and property density, the parameters including a type of sensor to use;

instructing, by the processor of the digital image processing apparatus through a data communication network, the imaging device to capture an image of the roof using the determined location and identified imaging device, the imaging device including at least one of a space-based image sensor and an aerial image sensor;

performing, by the processor of the digital image processing apparatus, image analysis on the captured image of the roof to identify a characteristic of the damage and a characteristic of the property, including:

applying a contrast filter to determine a roof age and roof material type, and performing edge detection to determine whether a roof pitch is within a predetermined pitch range;

determining one or more criterion for inspecting the damage based on the identified characteristic of the damage and the characteristic of the property, the one or more criterion including required equipment;

selecting an inspection entity from a plurality of inspection entities based on satisfaction of the one or more criterion; and scheduling the inspection entity to physically inspect the roof of the property.

17. The apparatus of claim 16, wherein the notification of the damage includes an insurance claim.

18. The apparatus of claim 16, wherein determining the one or more criterion for inspecting the damage includes determining one or more safety regulations applicable to the property based on the characteristic of the property.

19. The apparatus of claim 16, wherein selecting the inspection entity is performed based on the inspection entity satisfying all of the one or more criterion and the inspection entity having availability within a specified time window.

20. The apparatus of claim 16, wherein the instructions, when executed, further cause the apparatus to generate an insurance premium adjustment based on at least one of: a number of the determined one or more criterion and a type of the determined one or more criterion.

* * * * *

UNITED STATES PATENT AND TRADEMARK OFFICE
CERTIFICATE OF CORRECTION

PATENT NO.        : 10,430,890 B1
APPLICATION NO.   : 15/177944
DATED             : October 1, 2019
INVENTOR(S)       : Bryan Keith Corder et al.

It is certified that error appears in the above-identified patent and that said Letters Patent is hereby corrected as shown below:

In the Claims

In Column 13, Claim 1, Line 16:
Please replace "image" with --digital image--.

In Column 13, Claim 1, Line 20:
Please replace "image" with --digital image--.

In Column 13, Claim 1, Line 42:
Please replace "image" with --digital image--.

In Column 13, Claim 1, Line 55:
Please replace "image" with --digital image--.

In Column 13, Claim 1, Line 61:
Please replace "roof type" with --roof material type--.

In Column 14, Claim 3, Line 5:
Please replace "including" with --includes--.

In Column 14, Claim 5, Line 11:
Please replace "wherein" with --wherein the--.

In Column 14, Claim 7, Line 21:
Please replace "roof type" with --roof material type--.

In Column 14, Claim 7, Line 24:
Please replace "roof type" with --roof material type--.

Signed and Sealed this
Tenth Day of December, 2019

Andrei Iancu
*Director of the United States Patent and Trademark Office*

CERTIFICATE OF CORRECTION (continued)
U.S. Pat. No. 10,430,890 B1

In Column 14, Claim 8, Line 39:
Please replace "roof type" with --roof material type--.

In Column 14, Claim 8, Line 40:
Please replace "specified roof pitch" with --roof pitch--.

In Column 14, Claim 10, Line 60:
Please replace "imaging" with --aerial digital imaging--.

In Column 15, Claim 10, Line 5:
Please replace "imaging" with --digital imaging--.

In Column 15, Claim 10, Line 8:
Please replace "the digital image" with --the image--.

In Column 15, Claim 10, Line 23:
Please replace "image" with --digital image--.

In Column 16, Claim 15, Line 1:
Please replace "roof type" with --roof material type--.

In Column 16, Claim 15, Line 2:
Please replace "specified roof pitch" with --roof pitch--.